April 3, 1962 G. W. LOVELL 3,027,639
PNEUMATICALLY OPERATED PIE CUTTER
Filed Feb. 10, 1960 2 Sheets-Sheet 1

INVENTOR:
GILBERT W. LOVELL
BY
Ralph F. Staubly
ATTORNEY

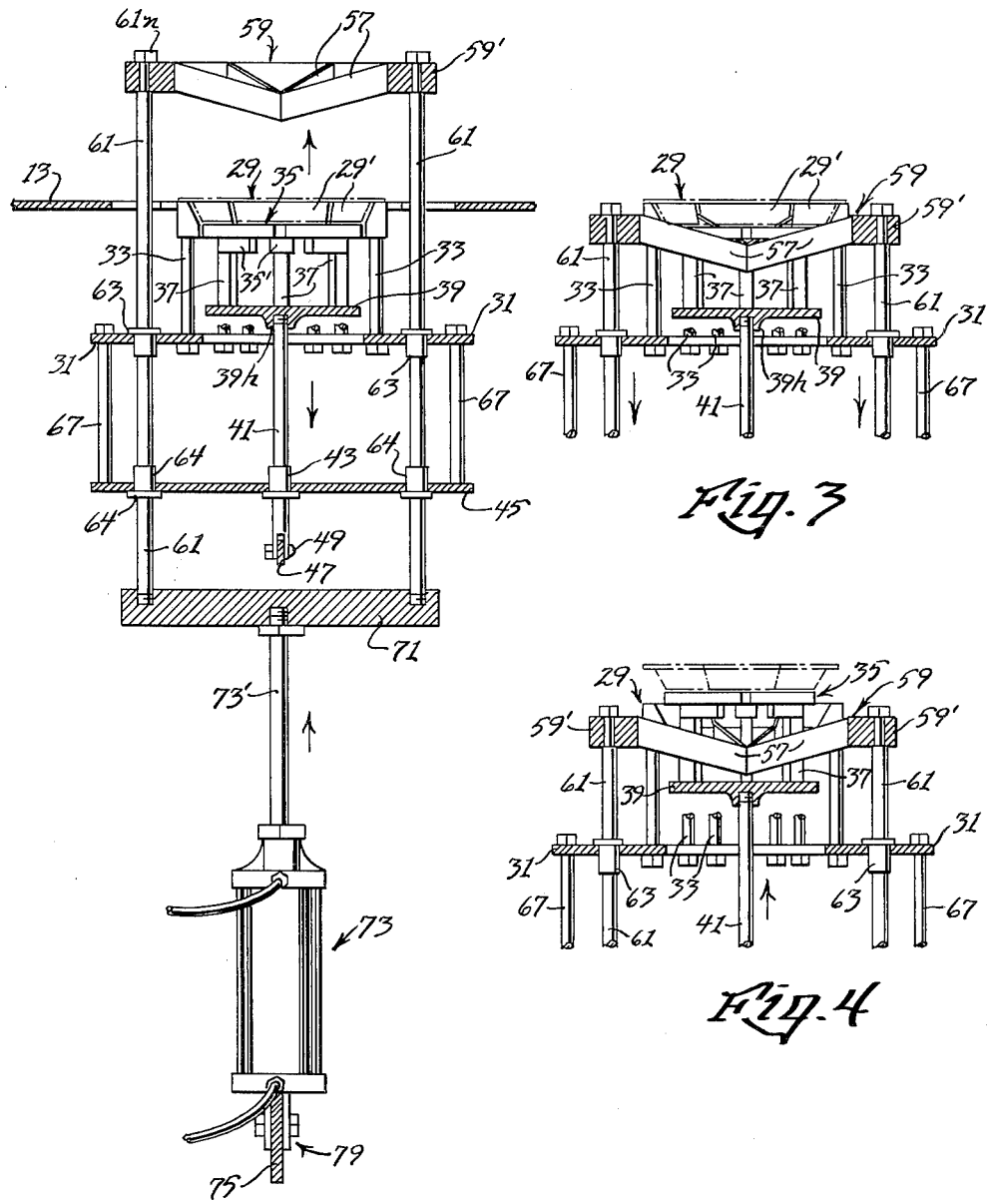

United States Patent Office 3,027,639
Patented Apr. 3, 1962

3,027,639
PNEUMATICALLY OPERATED PIE CUTTER
Gilbert W. Lovell, 301 Demonbreun St., Nashville, Tenn.
Filed Feb. 10, 1960, Ser. No. 7,905
6 Claims. (Cl. 30—114)

This invention relates to a pneumatically operated pie cutter.

More particularly the invention pertains to apparatus for quickly, easily and accurately cutting a pie into any desired number of equal sector-shaped slices, said apparatus comprising: a table-top panel of a size to hold a plurality of cut and uncut pies, an opening in said panel, a beveled pie-centering ring mounted in said opening substantially flush with the panel, a disk forming a movable bottom for the pie-shaped well formed by itself and said ring, said ring and bottom disk being radially cut into separately supported arcs and sectors between which the blades of a star-shaped pie cutter vertically reciprocate, double-acting pneumatic cylinders for raising and lowering said disk and pie cutter, and four-way valves for (manually) operating said cylinders.

It is the principal object of this invention to provide a pneumatically powered apparatus for quickly, easily and effectively cutting a pie held on a paper plate simultaneously into any desired number of equal slices.

It is another object to provide such an apparatus in which the cut pie is elevated after the cutting operation to facilitate removal of the cut slices.

It is a further object to design and space the controls so that both of the operator's hands are required to be away from the cutting zone during the pie-cutting and pile-lifting operations to prevent accidents.

These and other objects and advantages of the invention will become apparent as the following detailed description proceeds.

In the drawings:

FIG. 2 is an enlarged fragmentary front elevational view, partly in vertical axial section, showing the moving parts in their static positions immediately preceding the cutting stroke.

FIG. 3 is a view similar to FIG. 2 but showing the parts at the end of the cutting stroke of the blades.

FIG. 4 is a view similar to FIG. 3 but showing the cut pie lifted to facilitate removal of the severed pieces.

Figure 1:
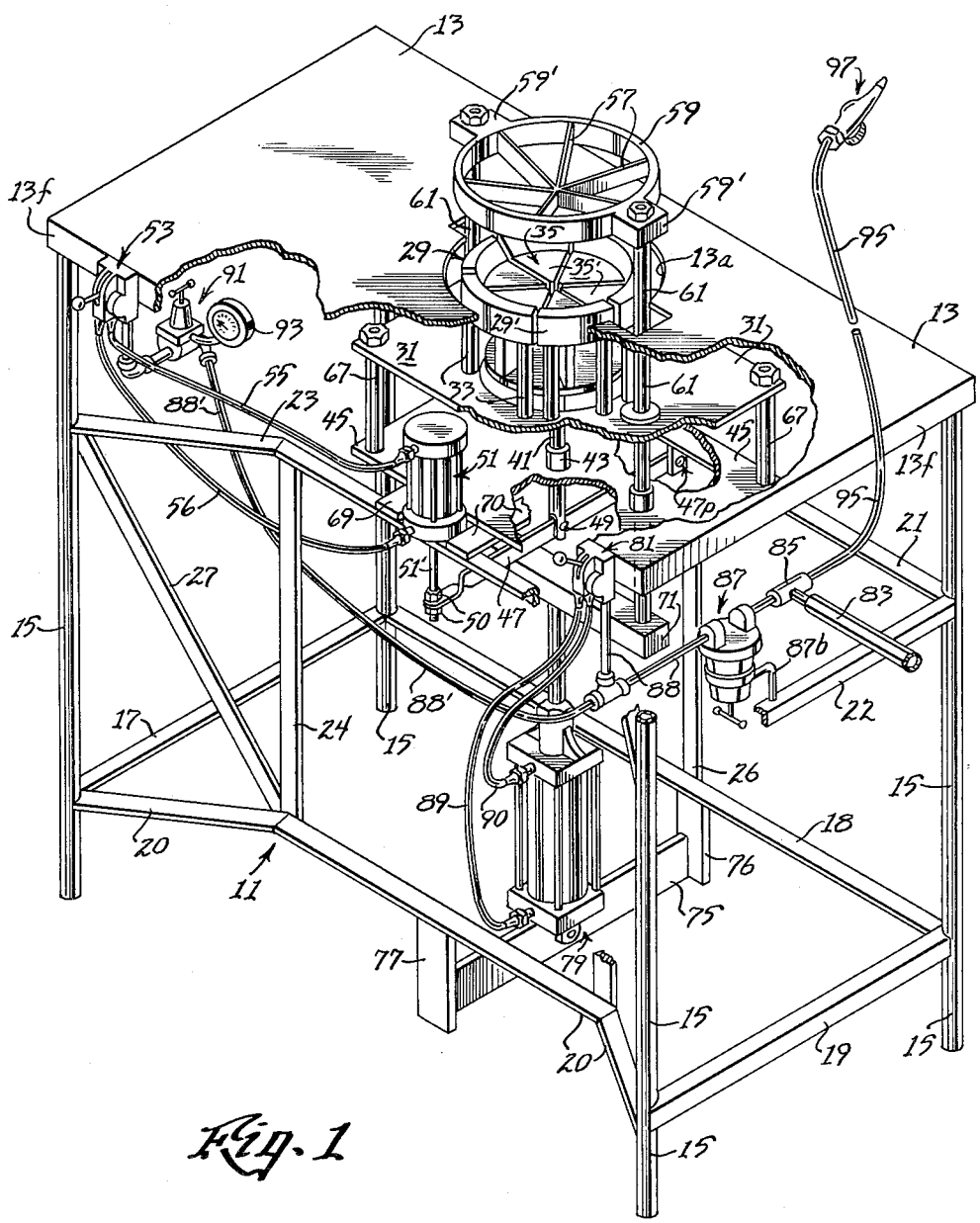
FIG. 1 is a perspective view of a preferred embodiment of the invention.

With reference now to the drawings, the numeral 11 generally designates the frame which supports the sheet-metal table top 13 as well as the other parts of the apparatus. Frame 11 is disclosed as being made of leg-forming pipes 15 welded or otherwise fixed to the corners of the top panel 13 adjacent the junctions of its downturned flanges 13f. Frame 11 is completed by a plurality of bracing bars 17–27 of angle or other cross-section, all interconnected into a rigid structure by welding or other conventional operations.

Table top 13 is centrally apertured at 13a to accommodate the pie-cutting apparatus proper. This apparatus consists of an annulus 29 having a downwardly and inwardly tapered inner surface corresponding in size and slope to the sides of the paper pie plates holding the pies to be cut into sections thereon. The annulus 29 is formed of segments 29' corresponding to the number of slices to be cut from each pie, and each segment 29' is supported from a support plate 31 by a pair of posts 33. A disk 35 cut into slice-size segments 35' forms a vertically movable bottom for the pie-receiving holder 29–35. Each segment 35' is supported rigidly by a post 37 welded thereto at its upper end and to the support disk 39 at its lower end. Support disk 39 has a bored and tapped hub 39h for co-axially receiving lift rod 41 slidable axially in sleeve 43 mounted in an aperture in the plate 45. The lower end of lift rod 41 is bifurcated to straddle the lever 47 and is fastened thereto by a pin 49. The far end of lever 47 is pivotally connected to the frame fixture 47p. The free end of lever 47 is connected by nuts 50 to the piston rod 51' of a double-acting pneumatic cylinder 51 controlled in its up and down movements by a conventional four-way valve generally designated 53 and connected thereto by the conduits 55 and 56.

The pie-slicing mechanism comprises a plurality of centrally joined radially disposed blades 57 fixed at their outer ends to a carrying ring 59 having diametrically opposite mounting lugs 59' thereon. Lugs 59' are vertically bored to receive the threaded reduced-diameter upper ends of the knife-reciprocating rods 61 fixed thereto by the nuts 61n. The cutting edges of the blades 57 are desirably downwardly and inwardly inclined to improve the cutting action by tending to move slightly the pie filling away from the apex of each slice.

The reciprocating rods 61 are guided by the pairs of bearing sleeves 63 and 64 press-fitted or otherwise held in apertures in the plate 45 and in the parallel plate 31 fixed to plate 45 by posts 67. Plate 45 is fixed to the frame elements 69 and 70. The lower ends of rods 61 are screwed into tapped bores in the ends of the bridging bar 71, the center of which is similarly connected to the upper end of the piston rod 73' of the pneumatic cylinder 73. Cylinder 73 is mounted on the frame-attached cradle defined by the weld-connected elements 75–77 by the bifurcated fixture generally designated 79. Cylinder 73 like cylinder 51 is double-acting and is controlled by a four-way valve 81, which directs compressed air alternately above and below the piston of cylinder 73 to produce the cutting and blade-elevating strokes respectively. Compressed air is fed to the apparatus from a conventional compressor (not shown) by the conduit 83. T 85 directs the air to adjustable pressure-reducing valve 87 (mounted on bracket 87b) from which it is conducted by line 88 to valve 81 for selective direction thereby thru conduits 89 and 90 to the cylinder 73. The extension 88' of line 88 also conducts compressed air to the valve 53 through the additional pressure-reducing valve 91 (which desirably has its own output-pressure-indicating gauge 93) since less pressure is required for the pie-elevating mechanism. T 85 also directs air thru hose 95 to the apparatus-cleaning nozzle 97.

While I have disclosed a preferred embodiment of my invention, it is to be understood that many changes can be made in the size, shape and arrangements of the parts without departing from the spirit of the invention; the lever 47 could be omitted in a construction in which the pie-supporting disk 35 is mounted directly on the upper end of the piston rod of the relocated cylinder 51.

Having thus described my invention, I claim:

1. A pie cutting apparatus comprising dished support means having a separate bottom wall, radially disposed vertical slots extending entirely through said dished means including said bottom wall, radially disposed knives of the same configuration as said slots, means for reciprocably mounting said knives over said dished support means, and means for reciprocating said knives through said slots, and means for reciprocating said bottom wall to an elevated ejecting position.

2. A pie cutting apparatus comprising dished support means having a separate bottom wall, radially disposed vertical slots extending entirely through said dished means including said bottom wall, radially disposed knives of the same configuration as said slots, means for reciprocably mounting said knives over said dished support means, and means for reciprocating said knives from a raised inoperative position downward through said slots to a position below the upper surface of said dished means, and means for reciprocating said bottom wall from a normal bottom position to an ejecting position above said bottom position.

3. A pie cutting apparatus comprising dished support means, said dished means having stationary side walls and a separate bottom wall, radially disposed vertical slots extending entirely through said dished means, the slots in said bottom wall being aligned with the slots in said side walls, knife support means mounted above said dished means, radially disposed knives mounted in said knife support means in the same configuration as said slots, means for reciprocating said knife support means between an elevated inoperative position and a lower operative position whereby said knives are adapted to pass through their corresponding radially aligned slots to a position below the upper surfaces of said side and bottom walls, and means for vertically reciprocating said bottom wall between its normal bottom position and an ejecting position above said bottom position.

4. The invention according to claim 3 in which said side walls comprise an annulus, and said bottom wall comprises a disc.

5. The invention according to claim 1 in which the means for reciprocating said knives and the means for reciprocating said bottom wall comprise double-acting fluid operated cylinders.

6. The invention according to claim 1 in which said bottom wall is divided into segments by said radial slots, a bottom wall support plate, means on said support plate for mounting each segment in spaced relation above said support plate, and means operatively connecting said bottom wall reciprocating means to said support plate.

References Cited in the file of this patent

UNITED STATES PATENTS

| | | |
|---|---|---|
| 1,563,844 | Gerlach | Dec. 1, 1925 |
| 2,395,237 | Swenson | Feb. 19, 1946 |
| 2,647,549 | Koch | Aug. 4, 1953 |
| 2,692,430 | Kraft et al. | Oct. 26, 1954 |
| 2,707,504 | Hill | May 3, 1955 |